(12) United States Patent
Smith et al.

(10) Patent No.: US 12,545,422 B2
(45) Date of Patent: Feb. 10, 2026

(54) VARIABLE COMPRESSION AIR INTAKES FOR AIRCRAFT PROPULSION SYSTEMS AND METHODS FOR VARYING COMPRESSION OF AN AIR INTAKE

(71) Applicant: The Boeing Company, Arlington, VA (US)

(72) Inventors: Thomas R. Smith, Westminster, CA (US); Matthew J. Roode, Webster Groves, MO (US)

(73) Assignee: The Boeing Company, Arlington, VA (US)

( * ) Notice: Subject to any disclaimer, the term of this patent is extended or adjusted under 35 U.S.C. 154(b) by 222 days.

(21) Appl. No.: 18/101,626

(22) Filed: Jan. 26, 2023

(65) Prior Publication Data
US 2024/0253800 A1    Aug. 1, 2024

(51) Int. Cl.
*B64D 33/02*        (2006.01)

(52) U.S. Cl.
CPC ........ *B64D 33/02* (2013.01); *B64D 2033/026* (2013.01); *B64D 2033/0286* (2013.01)

(58) Field of Classification Search
CPC .............. B64D 33/02; B64D 2033/026; B64D 2033/0286; F02C 7/042
See application file for complete search history.

(56) References Cited

U.S. PATENT DOCUMENTS

| | | | |
|---|---|---|---|
| 3,265,331 A | 8/1966 | Miles | |
| 3,879,941 A * | 4/1975 | Sargisson | F02K 3/075 60/226.3 |
| 4,372,505 A | 2/1983 | Syberg | |
| 6,793,175 B1 | 9/2004 | Sanders et al. | |
| 7,637,455 B2 | 12/2009 | Silkey et al. | |
| 9,429,071 B2 | 8/2016 | Quackenbush et al. | |
| 2020/0023986 A1* | 1/2020 | Corin | F02C 7/04 |
| 2022/0243684 A1* | 8/2022 | Herrmann | B64G 1/4005 |
| 2023/0010124 A1 | 1/2023 | Zhang et al. | |

OTHER PUBLICATIONS

European Patent Office, Extended European Search Report, App. No. 23218385.5 (Jun. 5, 2024).

* cited by examiner

*Primary Examiner* — Ashesh Dangol
(74) *Attorney, Agent, or Firm* — Walters & Wasylyna LLC (57) ABSTRACT

A propulsion system for an aircraft includes an engine having a central axis. A cowl surrounds the engine and includes a cowl lip. A compression ramp is spaced away from the cowl lip. An inlet is formed by the cowl lip and the compression ramp. The compression ramp is non-planar. The compression ramp is movable relative to the cowl lip to vary compression of an inlet airflow through the inlet.

23 Claims, 9 Drawing Sheets

VARIABLE COMPRESSION AIR INTAKES FOR AIRCRAFT PROPULSION SYSTEMS AND METHODS FOR VARYING COMPRESSION OF AN AIR INTAKE

FIELD

The present disclosure relates generally to supersonic aircraft and, more particularly, to variable compression air intakes for supersonic aircraft propulsion systems and methods for varying compression of the air intake of supersonic aircraft propulsion systems.

BACKGROUND

Many supersonic aircraft utilize gas turbine engines that are capable of propelling the aircraft at supersonic speeds. These gas turbine engines generally operate on subsonic air flow at an upstream face of the engine. However, these gas turbine engines must operate at supersonic speed conditions throughout the flight regime. Generally, an inlet is used to decelerate the incoming airflow to speeds compatible with the operating requirements of the gas turbine engine. For example, a movable cowl can be used to adjust the amount of air captured at different flight speeds. However, a disadvantage of conventional inlet design is the excess weight and complexity associated with the number of moving parts needed to decelerate the airflow. Accordingly, those skilled in the art continue with research and development efforts in the field of variable air intakes for supersonic aircraft propulsion systems.

SUMMARY

Disclosed are examples of a propulsion system for aircraft, an aircraft, a variable compression air intake for an aircraft propulsion system, and a method for varying compression at an air intake of an aircraft propulsion system. The following is a non-exhaustive list of examples, which may or may not be claimed, of the subject matter according to the present disclosure.

In an example, the disclosed propulsion system includes an engine having a central axis. The propulsion system includes a cowl surrounding the engine and including a cowl lip. The propulsion system includes a compression ramp that is spaced away from the cowl lip. The propulsion system includes an inlet formed by the cowl lip and the compression ramp. The compression ramp is non-planar. The compression ramp is movable relative to the cowl lip to vary compression of an inlet airflow through the inlet.

In an example, the disclosed aircraft includes an airframe and an engine coupled to the airframe. The aircraft includes an air intake in fluid communication with the engine. The air intake includes an inlet cowl that includes a cowl lip. The air intake includes a compression ramp that is spaced away from the cowl lip. The air intake includes an inlet formed by the cowl lip and the compression ramp. The compression ramp is non-planar. The compression ramp is movable relative to the cowl lip to vary compression of an inlet airflow through the inlet.

In an example, the disclosed air intake includes a cowl that includes a cowl lip. The air intake includes a first compression surface that is spaced apart from and fixed relative to the cowl lip. The air intake includes a second compression surface that is positioned downstream of the first compression-surface and movable relative to the cowl lip. The second compression surface defines a throat of an inlet airflow path. Movement of the second compression surface relative to the cowl lip selectively varies a geometry of the throat to vary compression of an inlet airflow.

In an example, the disclosed method includes steps of: (1) moving a compression ramp 108 relative to a cowl lip 106 of a cowl 104 between a low-speed configuration and a high-speed configuration; and (2) varying compression of an inlet airflow through an inlet.

Other examples of the disclosed propulsion system, aircraft, air intake, and method will become apparent from the following detailed description, the accompanying drawings, and the appended claims.

DETAILED DESCRIPTION

The present disclosure is generally directed to supersonic and hypersonic aerospace vehicles. More particularly, the present disclosure is direct to improvements in air intakes for propulsion systems of supersonic and hypersonic aerospace vehicles.

The present disclosure recognizes that supersonic and hypersonic aerospace vehicles must operate in a wide range of Mach numbers from take-off to cruising speeds to landing. The present disclosure also recognizes the importance of proper performance of an inlet of the air intake at each flight regime (e.g., subsonic, transonic, and supersonic or hypersonic). The present disclosure further recognizes that designing air-intake inlets with high Mach ranges for propulsion systems presents particular challenges due to a number of different requirements that must be reconciled.

As examples, an air-intake inlet requires a large opening in subsonic conditions (e.g., less than approximately Mach 0.8) with no internal contraction. In other words, air passing a lip of the inlet doesn't contract but, rather, expands on its way to an intake (e.g., a fan face) of the engine. A similar requirement for no internal contraction exists through transonic flight (e.g., between approximately Mach 1.0 and Mach 1.6). In one or more examples, at transonic speeds, the engine can only process approximately half of the air entering a fixed cowl of the air intake, for example, where the inlet is fixed and is sized for a particular high-Mach condition. Generally, the airflow captured can vary by a factor of two or three or more across the various speed ranges of the vehicle, such as when sized for high supersonic flight speeds. A throat of the air intake needs to begin contracting above low supersonic flight conditions (e.g., approximately Mach 1.6). At cruising conditions (e.g., above approximately Mach 1.6), the throat must be fully contracted, such that an area ratio between an area captured and the throat area is relatively high. An external compressing part of the inlet must exhibit good performance as a compressing device at speeds greater than Mach 1.6. An internal portion of the inlet, including, for example, a diffuser, must be smooth and present air to the engine that is as uniform as possible. In other words, the diffuser can't have separated flow, or this condition is violated.

Accordingly, disclosed herein are designed for air intakes for propulsion systems of aerospace vehicles that operate in a wide Mach range and that solve the above-recognized problems. Examples of the air intake include a unique implementation of a waverider bump, which is a three-dimensional inlet that is streamline traced through an axisymmetric inlet flow field. Generally, the bump is shaped such that the flow over the bump resembles that of the parent flow field. The inlet is designed to provide quality air to an engine from take-off up, to cruising air speeds, such as supersonic speeds (e.g., above approximately Mach 1) and hypersonic speeds (e.g., above approximately Mach 5), and back to landing. The inlet has a fixed cowl with only two moving pieces for variable geometry. In one or more examples, a one-piece bump rolls back and down on a circular ramp or path that allows it to create a larger throat with the cowl. A one-piece diffuser surface slides aft at the back and rotates down at the front where it attaches to the bump. The diffuser creates the smooth transition from the throat area created by the bump back to the engine fan face. In one or more examples, the two moving pieces seal at the sides on two parallel planar walls. Utilization of only two moving parts provides advantages in complexity, size, and cost. Additionally, bump inlets have an added advantage of rolling the boundary layer off to the sides prior to the inlet. In other words, the inlet ingests less low velocity air, improving performance and improving uniformity at the engine fan face.

Additionally, in one or more examples, a cowl is sized for the highest operating speed that the inlet is anticipated to handle. In other words, the inlet captures about twice the air the engine can process at transonic speeds.

The present disclosure also recognizes that existing solutions capture all the boundary layer in the inlet flow and require substantial bleed to siphon it off. The air intake design disclosed herein includes a bump inlet that naturally diverts the boundary layer prior to the internal portion of the inlet, thereby requiring less bleed and increasing kinetic energy efficiency of the inlet.

The present disclosure further recognizes that existing solutions have multiple two-dimensional moving ramps, linkages, actuators, and system controls, generate more tortuous bleed paths, and result in much heavier structures. The air intake design disclosed herein utilizes a lighter, fixed cowl, simpler bleed paths, only two moving ramps, simpler planar side seals, and three transverse seals.

Figure 1:
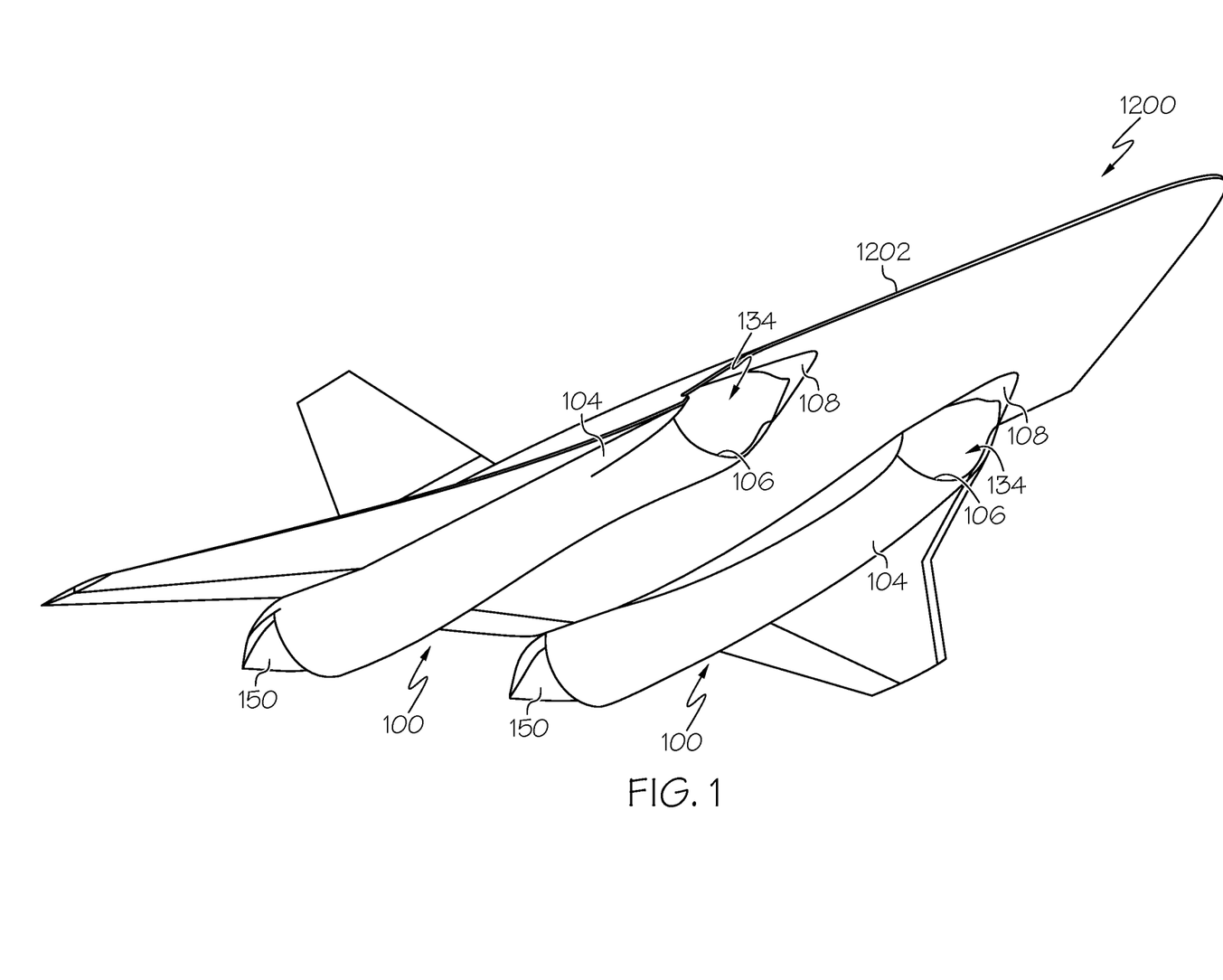
FIG. 1 is a schematic illustration of an example of an aircraft.
Figure 2:
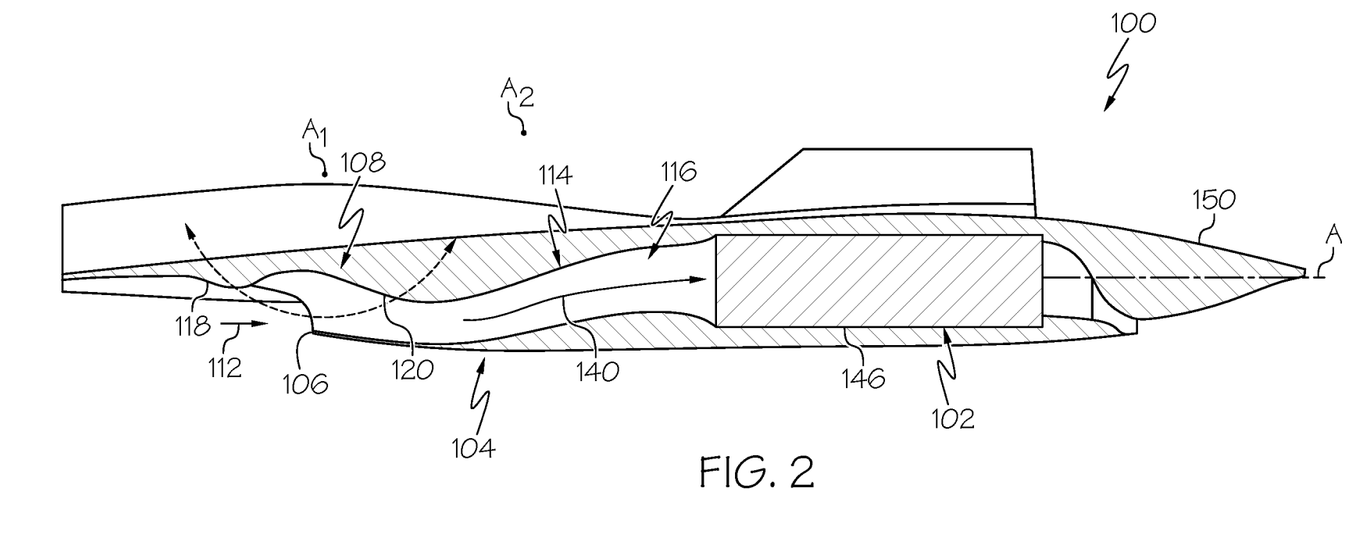
FIG. 2 is a schematic, section view of an example of a propulsion system of the aircraft, depicting a low-speed configuration.
Figure 3:
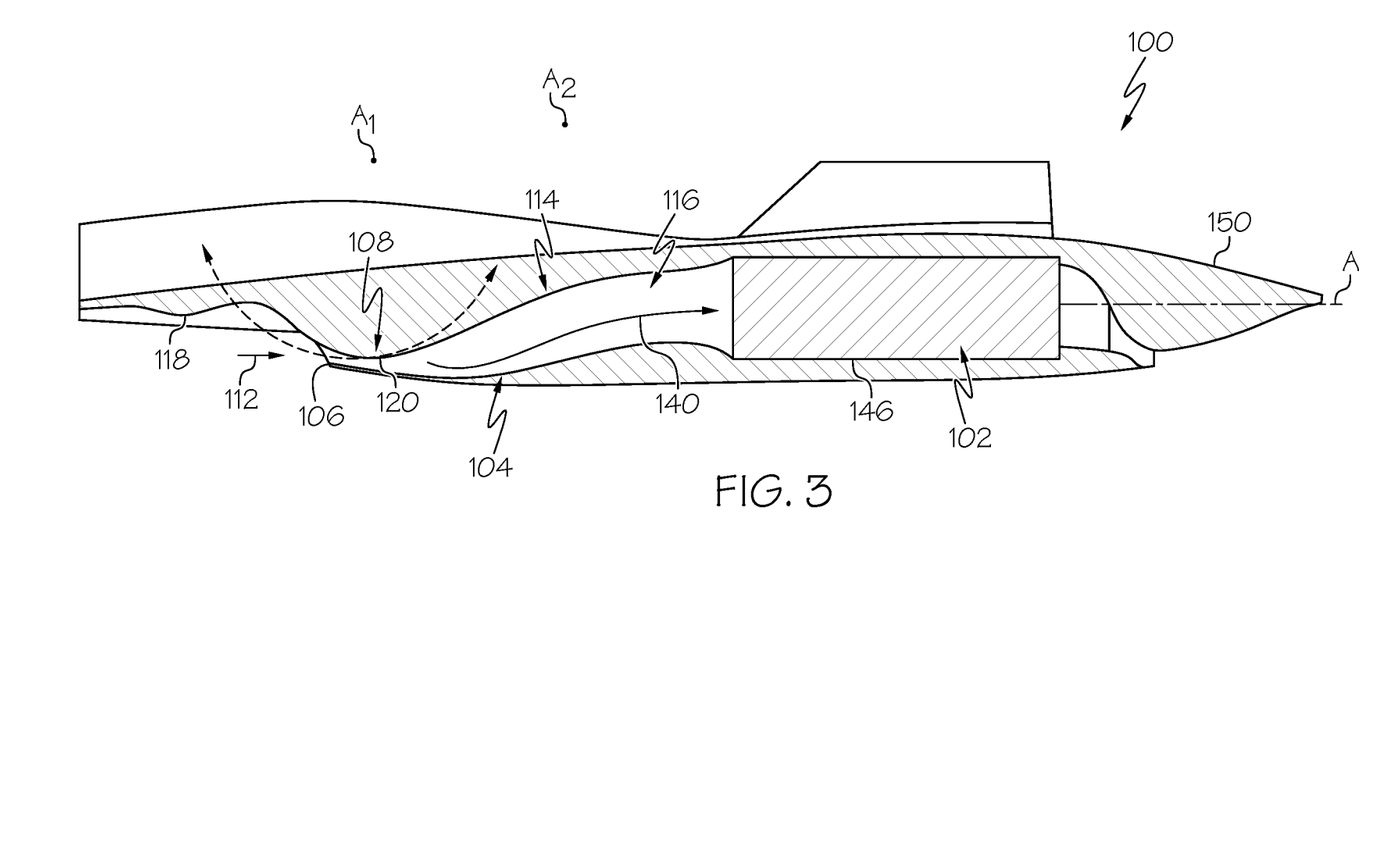
FIG. 3 is a schematic, section view of an example of the propulsion system of the aircraft, depicting a high-speed configuration.

Referring to FIG. 1, by way of examples, the present disclosure is directed to an aircraft 1200. Referring to FIGS. 1-3, by way of examples, the present disclosure is also directed to a propulsion system 100 for the aircraft 1200. Referring to FIGS. 1-3 and to FIGS. 4-8, by way of examples, the present disclosure is further directed to an air intake 134 for the propulsion system 100 of the aircraft 1200.

Generally, as will be described in more detail herein, the propulsion system 100 includes an engine 102, a cowl 104, a compression ramp 108, and a diffuser ramp 114. An inlet 110 of the air intake 134 of the propulsion system 100 is formed by cowl lip 106 and the compression ramp 108. The compression ramp 108 includes a first bump 118 and a second bump 120. The first bump 118 is fixed relative to the cowl lip 106. The second bump 120 is movable relative to the cowl lip 106 and to the first bump 118. Movement of the second bump 120 of the compression ramp 108 varies compression of an inlet airflow 112 through the inlet 110.

Of particular advantage or benefit, the cowl 104 is fixed and is used to save weight by being an unbroken pressure vessel. A "rolling" three-dimensions waverider bump inlet provided by the first bump 118 and the second bump 120 of the compression ramp 108 offers superior compression performance across the Mach range. The bump (e.g., the first bump 118 and the second bump 120) naturally diverts the boundary layer, which sharply reduces the amount of bleed needed to present good flow the engine 102. For lower speeds, the bump (e.g., second bump 120) rolls back and dips into the body side of the inlet 110, which increases a throat area until the internal contraction ratio is a little less than one. The ability to have low contraction ratios essentially makes the inlet unstart-proof. The diffuser ramp 114 being a translating and rotating single piece participates with the compression ramp 108 to create a diffuser 116 with mild expansion participating in the unstart-proof nature of the inlet 110. The diffuser 116 maintains superior performance across the Mach range with good uniform flow at the engine inlet face. The two-piece inlet system has planar sides that enable simple sealing solutions. The two-piece design also enables simple actuation and mechanical solutions. Good compression performance is provided by the bump across Mach ranges. The bump provides natural boundary layer diversion. Good performance of the diffuser is provided across the Mach ranges and provides uniformity of flow at the engine face across Mach ranges.

Referring to FIG. 1 and to FIGS. 2-8, in one or more examples, the aircraft 1200 includes an airframe 1202. The engine 102 (FIGS. 2 and 3) is coupled to the airframe 1202. The air intake 134 is in fluid communication with the engine 102. The air intake 134 includes an inlet cowl 148. The inlet cowl 148 includes the cowl lip 106. The compression ramp 108 is spaced away from the cowl lip 106. The inlet 110 is formed by the cowl lip 106 and the compression ramp 108. The compression ramp 108 is non-planar. The compression ramp 108 is movable relative to the cowl lip 106 to vary compression of the inlet airflow 112 through the inlet 110. The compression ramp 108 includes the fixed first bump 118 and the movable second bump 120.

In one or more examples, the aircraft 1200 is any aerospace vehicle capable of flying at supersonic or hypersonic speeds. In one or more examples, as illustrated in FIG. 1, the aircraft 1200 is a fixed-wing aircraft. In one or more examples, the aircraft 1200 has an advanced aerodynamic shape that includes a high lift-to-drag (L/D) ratio across Mach ranges. In other examples, the aircraft 1200 is a rocket, a missile, a spacecraft, an unmanned aerial vehicle (UAV), or other type of aerospace vehicle.

In one or more examples, the air intake 134 of the propulsion system 100 includes a high Mach range inlet (e.g., the inlet 110). The propulsion system 100 also includes a nozzle 150. The cowl 104 is fixed at a predetermined size for high-speed flight. A geometry of inlet 110 is variable and is selectively controlled by movement of the second bump 120 of the compression ramp 108. A geometry of the nozzle 150 is also variable.

In one or more examples, the engine 102 is a turbofan engine. As an example, the engine 102 is an intercooled augmented turbofan engine. In one or more examples, the engine 102 includes an inlet fan, a compressor, a combustor, a turbine, and a nozzle disposed along the central axis A. In one or more examples, these components are disposed within an engine casing, such as the cowl 104.

In one or more examples, the cowl 104 includes an inlet cowl 148. The inlet cowl 148 forms at least a portion of the air intake 134 and surrounds the second bump 120 of the compression ramp 108 and the diffuser ramp 114. In one or more examples, an interior wall 128 of the cowl 104, such as of the inlet cowl 148 forms a duct (e.g., an inlet duct) that directs the inlet airflow 112 from the inlet 110 to the engine 102.

Referring to FIGS. 2 and 3, which schematically illustrate examples of the propulsion system 100 for the aircraft 1200, and to FIGS. 4-8, which schematically illustrate examples of an air intake 134 of the propulsion system 100. The air intake 134 of the propulsion system 100 is a variable compression air intake. In one or more examples, the propulsion system 100 includes an engine 102, a cowl 104, a compression ramp 108, and an inlet 110. The engine 102 has a central axis A. The cowl 104 surrounds the engine 102. The cowl 104 includes a cowl lip 106. The compression ramp 108 is spaced away from the cowl lip 106. The inlet 110 is formed by the cowl lip 106 and the compression ramp 108. The compression ramp 108 is non-planar. The compression ramp 108 is movable relative to the cowl lip 106 to vary compression of an inlet airflow 112 through the inlet 110.

Figure 4:
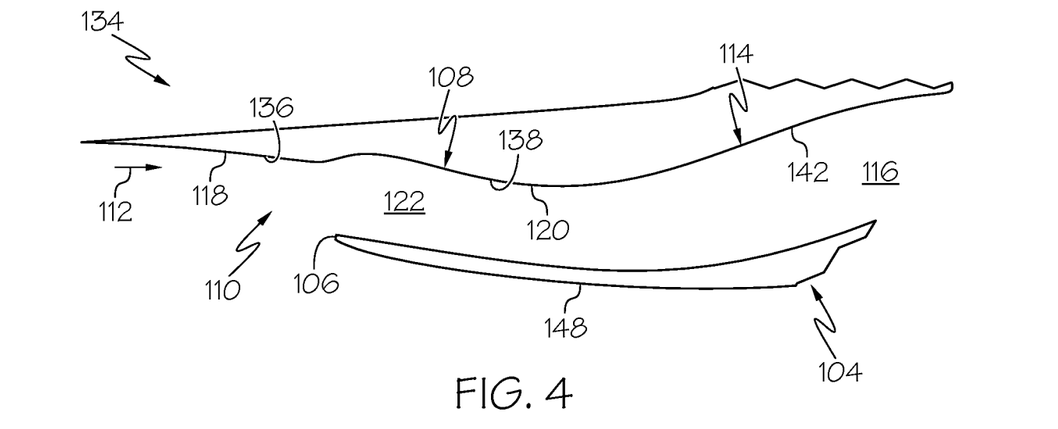
FIG. 4 is a schematic, section view of a portion of an air intake of the propulsion system, depicting the low-speed configuration.
Figure 5:
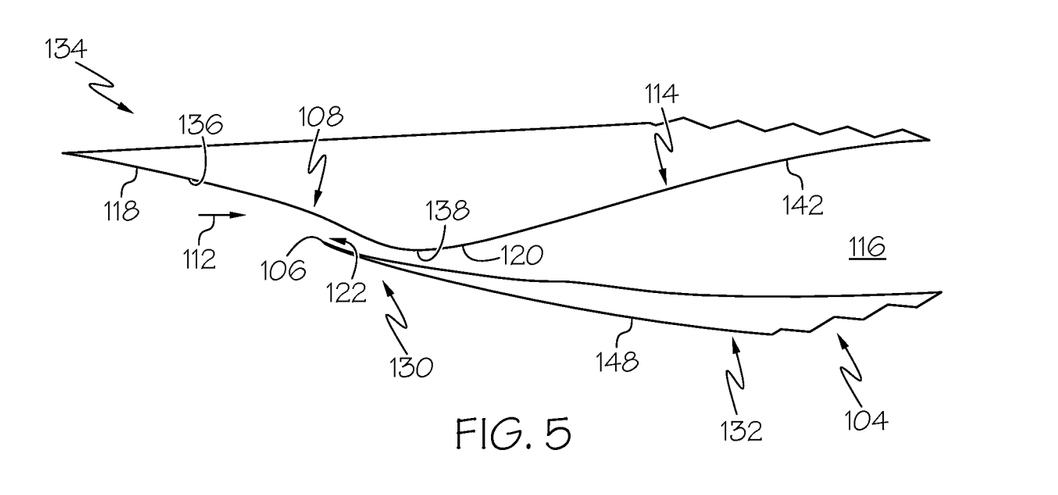
FIG. 5 is a schematic, section view of a portion of the air intake of the propulsion system, depicting the high-speed configuration.
Figure 6:
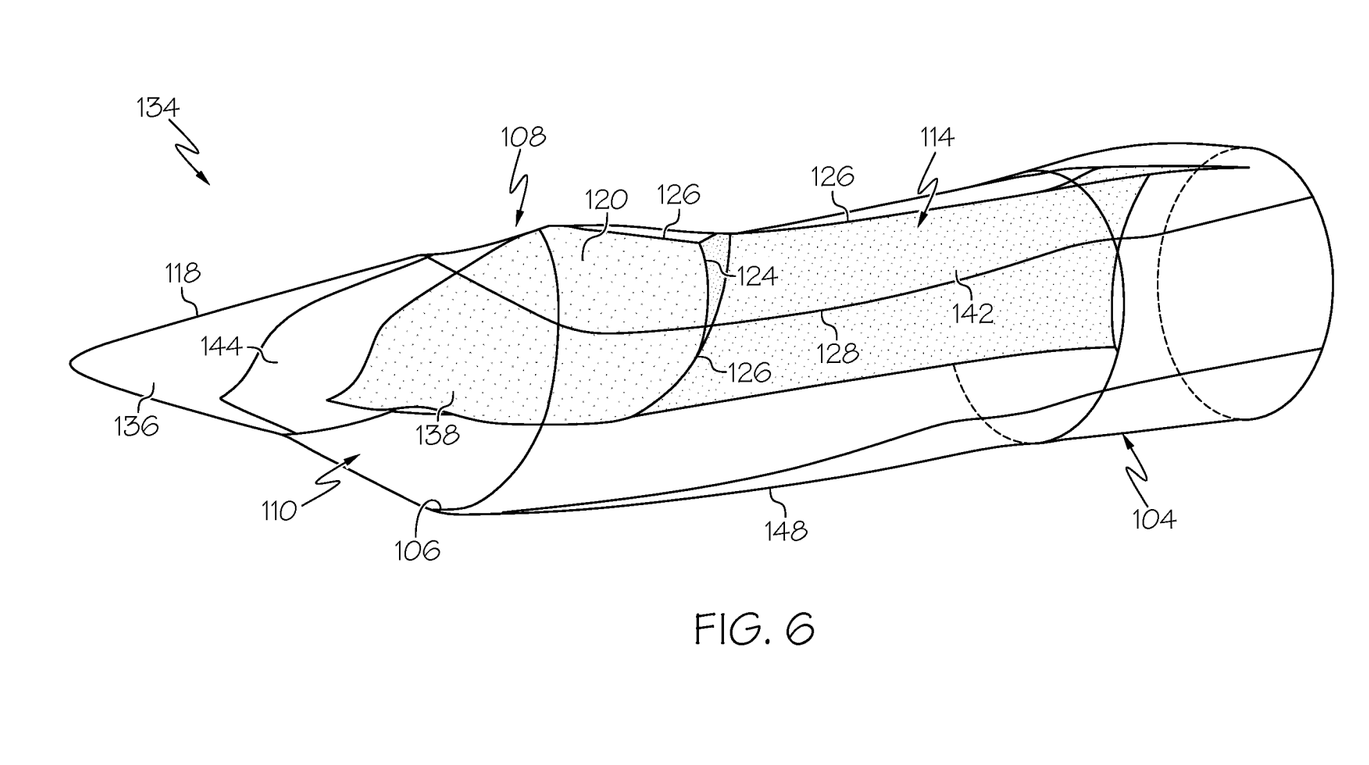
FIG. 6 is a schematic illustration of an example of the air intake of the propulsion system, depicting the low-speed configuration.
Figure 7:
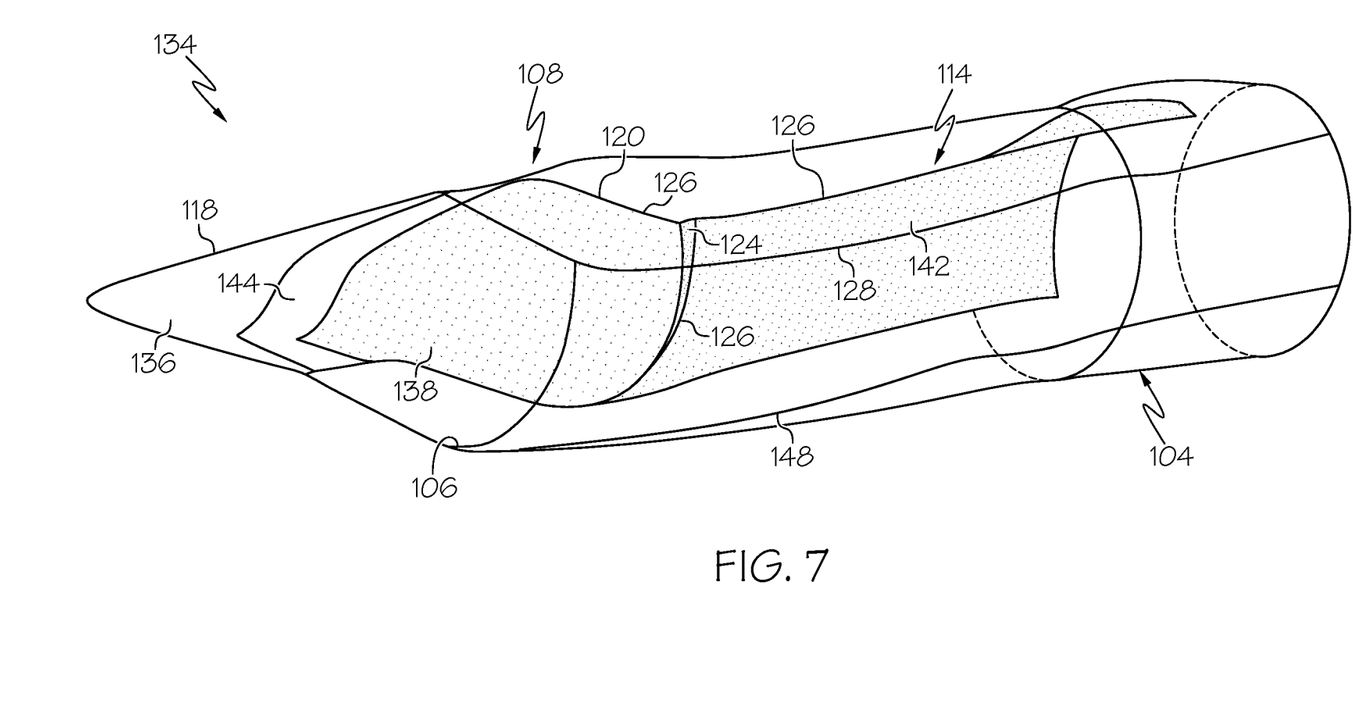
FIG. 7 is a schematic illustration of an example of the air intake of the propulsion system, depicting an intermediate-speed configuration.
Figure 8:
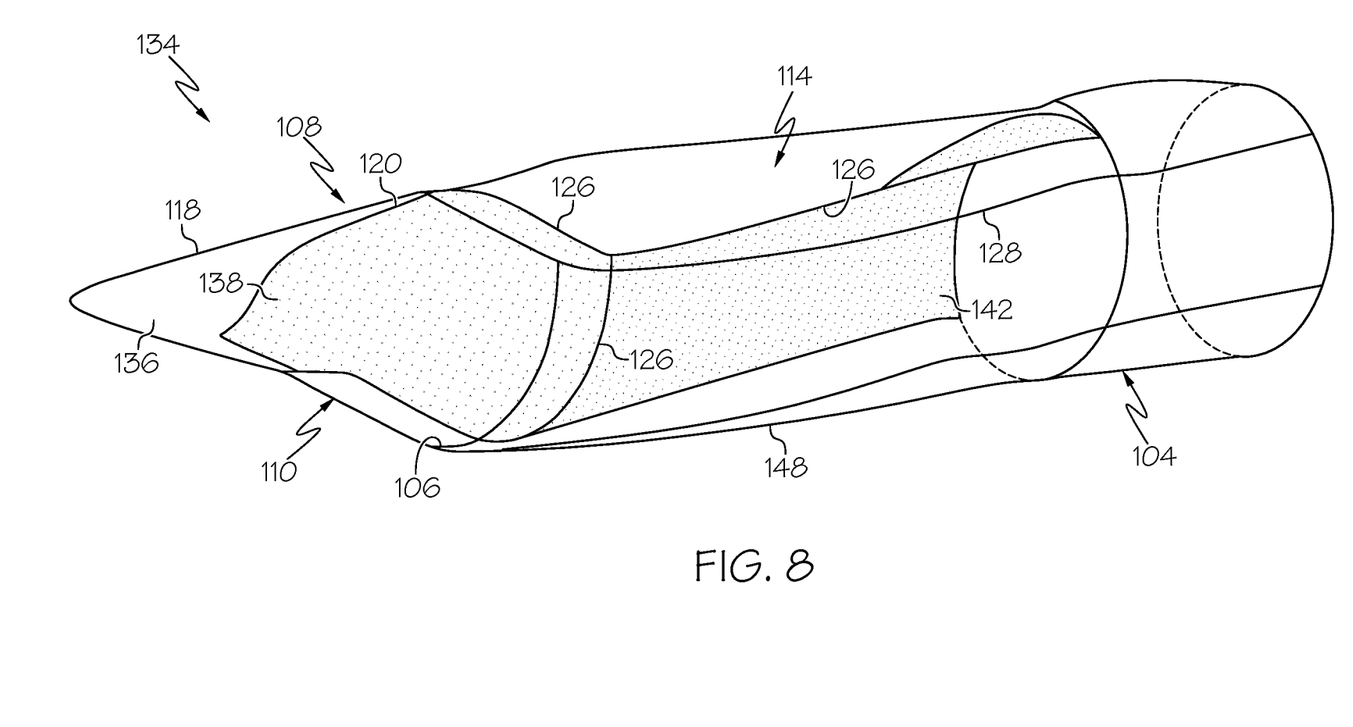
FIG. 8 is a schematic illustration of an example of the air intake of the propulsion system, depicting the high-speed configuration.

Referring to FIGS. 2-8, in one or more examples, the compression ramp 108 is movable between a low-speed configuration and a high-speed configuration. FIGS. 2, 4 and 6 illustrate examples of the propulsion system 100 and the air intake 134 in the low-speed configuration. FIGS. 3, 5 and 8 illustrate the propulsion system 100 and the air intake 134 in the high-speed configuration. FIG. 7 illustrates an example of the propulsion system 100 and the air intake 134 in an intermediate configuration, between the low-speed configuration and the high-speed configuration. In the low-speed configuration, the compression ramp 108 reduces the compression of the inlet airflow 112 through the inlet 110. In the high-speed configuration, the compression ramp 108 increases the compression of the inlet airflow 112 through the inlet 110.

Accordingly, in one or more examples, the low-speed configuration (FIGS. 2, 4 and 6) may also be referred to as a reduced-compression configuration. In one or more examples, the high-speed configuration (FIGS. 3, 5 and 8) may also be referred to as an increased-compression configuration.

As used herein, low speed generally refers to subsonic speeds, such as speeds under approximately Mach 1, such as under approximately Mach 0.8. Low speed also refers to transonic speeds, such as speeds between approximately Mach 0.8 and Mach 2, such as between approximately Mach 1 and Mach 1.6. Intermediate speed generally refers to supersonic speeds, such as supersonic speeds between approximately Mach 2 and Mach 4, such as approximately Mach 3. High speed, or cruise speed, generally refer supersonic speeds, such as speeds greater than Mach 4. High speed also refers to hypersonic speeds, such as speeds greater than Mach 5.

Referring to FIGS. 2-8, in one or more examples, the compression ramp 108 includes a first bump 118 and a second bump 120. The first bump 118 is fixed relative to the cowl lip 106. The first bump 118 may also be referred to as a fixed bump. The second bump 120 is movable relative to the cowl lip 106 and to the first bump 118 to vary the compression of the inlet airflow 112 through the inlet 110. The second bump 120 may also be referred to as a movable bump.

Referring to FIGS. 4 and 5, in one or more examples, the propulsion system 100 and the air intake 134 includes the throat 122 of the inlet airflow path 140. The throat 122 is formed by the second bump 120 and the cowl lip 106. Movement of the second bump 120 relative to the cowl lip 106 varies a geometry of the throat 122. In the low-speed configuration (FIG. 4), the second bump 120 increases the geometry of the throat 122. In the high-speed configuration (FIG. 5), the second bump 120 decreases the geometry of the throat 122.

Generally, the throat 122 is the narrowest portion of the inlet airflow path 140. In the high-speed configuration, the throat 122 is positioned between a converging supersonic compression section 130 and a diverging subsonic diffuser section 132 of the air intake 134 (e.g., as shown in FIG. 5).

Referring to FIGS. 2 and 3 and to FIGS. 4-8, in one or more examples, the first bump 118 is non-planar. In one or more examples, the first bump 118 includes or takes the form of a conic section. In one or more examples, the second bump 120 is non-planar. In one or more examples, the second bump 120 includes or takes the form of a conic section.

Referring to FIGS. 4-8, in one or more examples, the first bump 118 includes a first compression surface 136. The second bump 120 includes a second compression surface 138. The first compression surface 136 is non-planar. The second compression surface 138 is non-planar.

Referring to FIGS. 6-8, in one or more examples, the first compression surface 136 is, includes, or takes the form of a conic section. In one or more examples, the second compression surface 138 is, includes, or takes the form of a conic section.

Referring to FIGS. 6-8, in one or more examples, the compression ramp 108 also includes an isentropic ramp surface 144. The isentropic ramp surface 144 extends between the first compression surface 136 and the second compression surface 138. Generally, the isentropic ramp surface 144 turns the inlet airflow 112 without making discreet shockwaves.

In one or more examples, the compression ramp 108 has three ramp stages formed by the first compression surface 136 of the first bump 118, the isentropic ramp surface 144, and the second compression surface 138 of the second bump 120.

In one or more examples, an orientation of the first compression surface 136 of the first bump 118, the second compression surface 138 of the second bump 120, and the isentropic ramp surface 144 is such that all shock waves and compression waves converge proximate (e.g., at or near) the cowl lip 106 (e.g., approximately one inch outside of the cowl lip 106 so as not to burn it up).

Referring to FIGS. 2-8, in one or more examples, the propulsion system 100 includes a diffuser ramp 114 and a diffuser 116. The diffuser ramp 114 is positioned between the compression ramp 108 and the engine 102. The diffuser 116 is formed by the cowl 104 and the diffuser ramp 114. For example, the diffuser 116 is formed by the interior wall 128 of the cowl 104. The diffuser ramp 114 is non-planar. The diffuser ramp 114 is movable relative to the engine 102 to vary a geometry of the diffuser 116 along the central axis A.

Referring to FIGS. 2-8, in one or more examples, the diffuser ramp 114 is movable between the low-speed configuration (e.g., shown in FIGS. 2, 4 and 6) and the high-speed configuration (e.g., shown in FIGS. 3, 5 and 8). In the low-speed configuration, the geometry of the diffuser 116 is substantially constant along the central axis A. In the high-speed configuration, the geometry of the diffuser 116 expands along the central axis A from the compression ramp 108 to the engine 102. For example, the diffuser 116 expands or diverges along the central axis A from the throat 122 to the inlet face of the engine 102.

Referring to FIGS. 2-8, in one or more examples, to move in the high-speed configuration, the second bump 120 rolls in a forward direction, toward (e.g., partially into) the inlet 110. To move in low-speed configuration, the second bump 120 rolls in an aft direction, away from (e.g., out from) the inlet 110. For the purpose of the present disclosure, roll or rolling motion of an item refers to a combination of translational and rotational motion.

In one or more examples, the second bump 120 is linearly movable, for example, along the central axis A. In one or more examples, the second bump 120 is rotationally movable. As an example, the second bump 120 is revolvably movable about a first axis A1 of revolution. The first axis A1 of rotation is spaced away from the central axis A and extends in a direction perpendicular to the central axis A. For example, the linear and rotational motion of the second bump 120 is achieved by revolving the second bump 120 about the first axis A1. As an example, the second bump 120 translates along a curved path, such as a portion of an at least approximately circular path.

Referring to FIGS. 2-8, in one or more examples, to move in the high-speed configuration, the diffuser ramp 114 translates in a forward direction, toward the inlet 110, and rocks downward. To move in low-speed configuration, the diffuser ramp 114 translates in an aft direction, away from the inlet 110, and rocks upward.

In one or more examples, the diffuser ramp 114 is linearly movable, for example, along the central axis A. In one or more examples, the diffuser ramp 114 is rotationally movable. As an example, the diffuser ramp 114 is revolvably movable about a second axis A2 of revolution. The second axis A2 of rotation is spaced away from the central axis A and extends in a direction perpendicular to the central axis A.

In one or more examples, movement of the second bump 120 and the diffuser ramp 114 can be achieved using any suitable device or mechanism. In one or more examples, the propulsion system 100 include a ramp drive that is coupled to compression ramp 108, such as to the second bump 120, and, optionally, to the diffuser ramp 114. The ramp drive is configured to produce the rolling motion of the second bump 120 and the translating and rocking motion of the diffuser ramp 114. The ramp drive includes any suitable drive train, such as motors, actuators, tracks, rails, guides, linkages, and the like.

Referring to FIGS. 6-8, in one or more examples, the diffuser ramp 114 is coupled to the second bump 120. In one or more examples, the diffuser ramp 114 moves with the second bump 120. As an example, movement of the diffuser ramp 114 results from or is driven by movement of the second bump 120.

Referring to FIGS. 6-8, in one or more examples, a seal 126 is located between the diffuser ramp 114 and the second bump 120. As an example, the second bump 120 and the diffuser ramp 114 are sealed together such that the second bump 120 and the diffuser ramp 114 are movable, independently and in combination, and such that air cannot pass between the second bump 120 and the diffuser ramp 114 on its way to the engine 102.

Referring to FIGS. 6-8, in one or more examples, a gap 124 is located between the diffuser ramp 114 and the second bump 120. As an example, the second bump 120 and the diffuser ramp 114 are spaced away from each other along the central axis A, are not sealed together, or are only partially sealed together such that the second bump 120 and the diffuser ramp 114 are movable, independently and in combination, and such that air can pass between the second bump 120 and the diffuser ramp 114 on its way to the engine 102.

Referring to FIGS. 6-8, in one or more examples, the seal 126 is located between the second bump 120 and a portion of an interior wall 128 of the cowl 104. As an example, the second bump 120 and the portion of the interior wall 128 of the cowl 104 are sealed together such that the second bump 120 is movable relative to the interior wall 128 and such that air cannot pass between the second bump 120 and the interior wall 128 on its way to the engine 102.

Referring to FIGS. 6-8, in one or more examples, the seal 126 is located between the diffuser ramp 114 and the portion of the interior wall 128 of the cowl 104. As an example, the diffuser ramp 114 and the portion of the interior wall 128 of the cowl 104 are sealed together such that the second bump 120 is movable relative to the interior wall 128 and such that air cannot pass between the second bump 120 and the interior wall 128 on its way to the engine 102.

In one or more examples, a first portion of the seal 126 is located between the diffuser ramp 114 and the second bump 120 to seal a joint or an interface between the diffuser ramp 114 and the second bump 120. A second portion of the seal 126 is located between the second bump 120 and the portion of the interior wall 128 of the cowl 104 to seal an interface between the second bump 120 and a portion of the interior wall 128. A third portion of the seal 126 is located between the diffuser ramp 114 and a portion of the interior wall 128 of the cowl 104 to seal an interface between the diffuser ramp 114 and the interior wall 128.

Referring to FIGS. 6-8, in one or more examples, the portion of the interior wall 128 of the cowl 104 is planar. At least the portion of the interior wall 128 that interfaces with the second bump 120 and the diffuser ramp 114 being planar facilitates sealing the interfaces during relative motion of the second bump 120 and the diffuser ramp 114.

Referring to FIGS. 2 and 3 and to FIGS. 4 and 5, in one or more examples, in the high-speed configuration (e.g., shown in FIGS. 3 and 5), the compression ramp 108 and the cowl 104 form a supersonic compression section 130 of the air intake 134 for the engine 102. The diffuser ramp 114 and the cowl 104 form a subsonic diffuser section 132 of the air intake 134.

Referring to FIGS. 2-8, in one or more examples, the air intake 134 is a variable compression air intake for a turbofan engine 146. The turbofan engine 146 is an example of the engine 102 of the propulsion system 100 of the aircraft 1200. The air intake 134 includes the cowl 104. The cowl 104 includes the cowl lip 106. The first compression surface 136 is spaced apart from the cowl lip 106. The first compression surface 136 is fixed relative to the cowl lip 106. The second compression surface 138 is positioned downstream of the first compression surface 136. The second compression surface 138 is movable relative to the cowl lip 106. The second compression surface 138 defines the throat 122 of the inlet airflow path 140. Movement of the second compression surface 138 relative to the cowl lip 106 selectively varies a geometry of the throat 122 to vary compression of the inlet airflow 112. In one or more examples, the air intake 134 includes the diffuser surface 142 that extends downstream from the second compression surface 138. In one or more examples, the diffuser surface 142 is coupled to the second compression surface 138. In one or more examples, the diffuser surface 142 is movable relative to the second compression surface 138 to vary a geometry of the diffuser 116 of the inlet airflow path 140. In one or more examples, the second compression surface 138 translates and rotates relative to the cowl lip 106. The diffuser surface 142 translates with the second compression surface 138 and rotates relative to the second compression surface 138. In one or more examples, the air intake 134 includes the isentropic ramp surface 144. The isentropic ramp surface 144 extends between the first compression surface 136 and the second compression surface 138.

Figure 9:
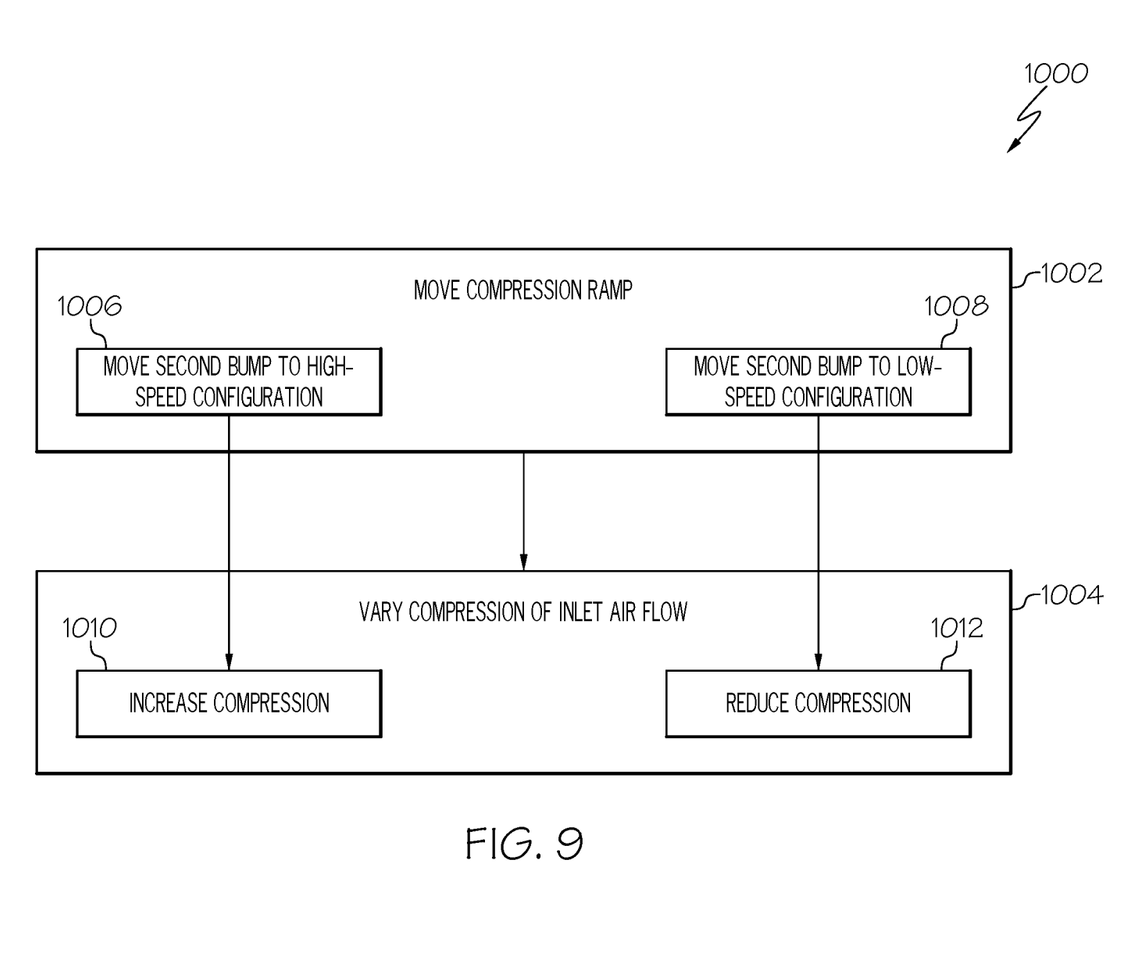
FIG. 9 is a flow diagram of an example of a method for varying compression of an air intake of an aircraft propulsion system.

Referring to FIG. 9 and to FIGS. 1-8, by way of examples, the present disclosure is also directed to a method for varying compression at the air intake 134 of the propulsion system 100 of the aircraft 1200, such as for the turbofan engine 146. Generally, implementations of the method 1000 are performed using examples of the variable compression air intake described herein above.

Referring to FIG. 9 and to FIGS. 2 and 3, in one or more examples, the method 1000 includes a step of (block 1002) moving the compression ramp 108 relative to the cowl lip 106 of the cowl 104 between the low-speed configuration and the high-speed configuration and a step of (block 1004) varying compression of the inlet airflow 112 through the inlet 110.

Referring to FIG. 9 and to FIGS. 3, 5 and 8, in one or more examples, according to the method 1000, the step of (block 1002) moving the compression ramp 108 includes a step of (block 1006) moving the second bump 120 relative to the first bump 118 and relative to the cowl lip 106 to the high-speed configuration. In the high-speed configuration, the step of (block 1004) varying the compression includes a step of (block 1010) increasing the compression of the inlet airflow 112 through the inlet 110.

Referring to FIG. 9 and to FIGS. 2, 4 and 6, in one or more examples, according to the method 1000, the step of (block 1002) moving the compression ramp 108 includes a step of (block 1008) moving the second bump 120 relative to the first bump 118 and relative to the cowl lip 106 to the low-speed configuration. In the low-speed configuration, the step of (block 1004) varying the compression includes a step of (block 1012) reducing the compression of the inlet airflow 112 through the inlet 110.

Accordingly, the propulsion system 100 and method 1000 disclosed herein address the following problems. The inlet is sized to Mach 5 cruise requirements, which is approximately three times (e.g., between approximately two to three times) too large for transonic requirements. From approximately Mach 1.0 to Mach 1.6 the engine consumes approximately one third of the airflow it needs during Mach 5 cruise, which results in the inlet spilling 60% of its air and, thus, a spill drag penalty. Generally, in a Mach 2 aircraft, 10% spilling is considered bad. The nozzle is also sized to Mach 5 cruise requirements, which is approximately three times too large for transonic requirements. From approximately Mach 1.0 to Mach 1.6 the engine will only exhaust one third the airflow it will during Mach 5 cruise, which results in the nozzle being only 30% filled and, thus, a base drag penalty. Accordingly, during transonic flight (e.g., Mach 1.0 to Mach 1.6), when the engine is at its weakest, the drag is unaffordable.

Additional problems addressed by the propulsion system 100 and method 1000 described herein include: the inlet (and the rest of the airflow path) must accommodate large airflow change (e.g., factor of 3 capture area change) required across Mach range, the cowl must resist high pressure inherent in inlet designs with as light and simple structure as possible, low cowl drag across Mach range, low spill drag across Mach range, the inlet ramp accommodate factor of twelve throat area change required across Mach range, duct system provides uniform enough flow at engine face across Mach range, turbo-ramjet provides adequate thrust across Mach range, the nozzle must accommodate a large area change across the Mach range to match the engine output, and low base drag due to unfilled nozzle across Mach range.

According to the present disclosure, propulsion system 100 and the method 1000 address the above-referenced problems. The compression ramp 108 and, more particularly, the second bump 120 is movable or articulating. Movement of the second bump 120 provides high operation performance at hypersonic cruise conditions. Movement of the second bump 120 also facilitates supercritical operation below freestream Mach 2. The inlet cowl 148 is fixed at the size required for a particular flight regime, such as Mach 5 cruise. The inlet 110 ingests 2× more air than the engine 102 can use during transonic flight. The forebody design bumps it up to 3×. The inlet cowl 148 is fixed, not split. As such it makes an efficient pressure vessel to contain the high-pressure air inherent in the inlet 110. This greatly increases the structural integrity and reduces weight, complexity, and risk. The fixed cowl 104 has a low forward-facing angle and so produces low cowl drag at all Mach numbers. There is zero spill drag across the entire Mach range as the cowl 104 ingests all the air. The bump inlet ramp system (e.g., the compression ramp 108, including the fixed first bump 118 and the movable second bump 120) accommodates the factor of twelve throat area change using as only two moving ramps (e.g., the first bump 118 and the second bump 120). This is not as heavy as conventional methods and introduces fewer gaps to seal.

Figure 10:
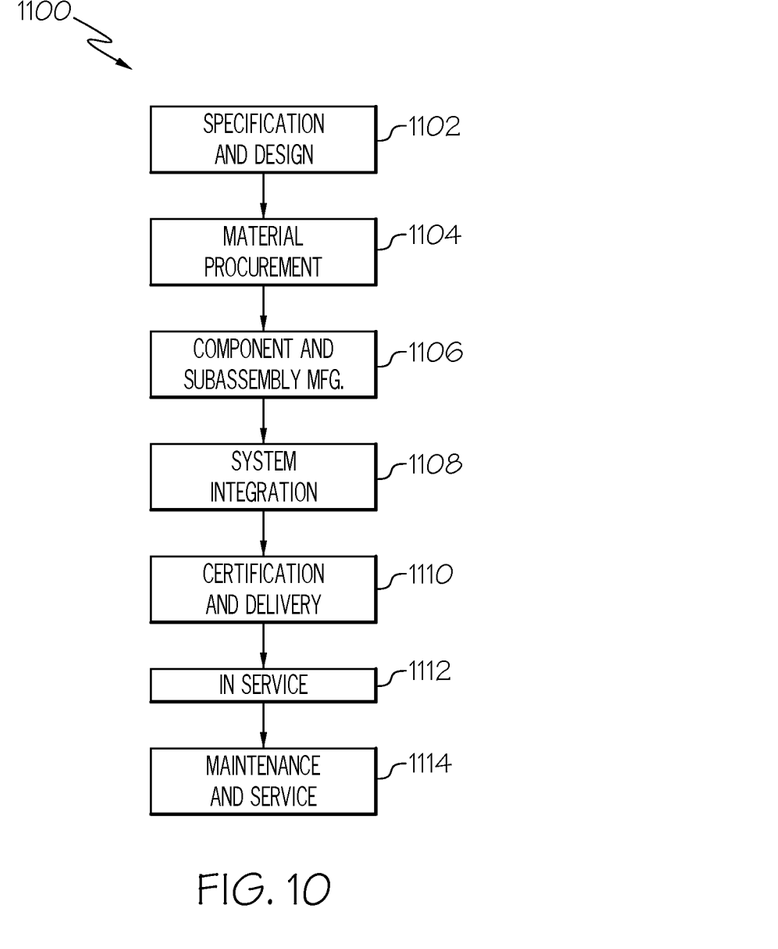
FIG. 10 is a flow diagram of an example of an aircraft manufacturing and service method.
Figure 11:
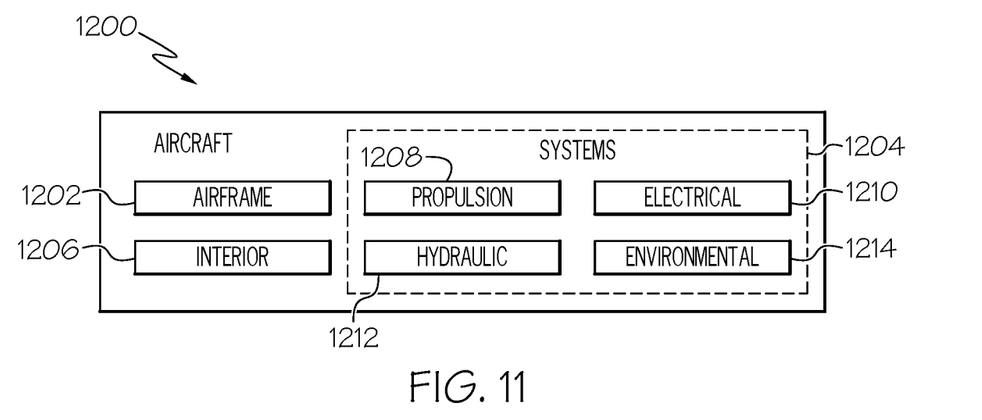
FIG. 11 is a schematic block diagram of an example of the aircraft.

Referring now to FIGS. 10 and 11, examples of the propulsion system 100, air intake 134, and the method 1000 described herein, may be related to, or used in the context of, an aircraft manufacturing and service method 1100, as shown in the flow diagram of FIG. 10 and the aircraft 1200, as schematically illustrated in FIG. 11. For example, the aircraft 1200 and/or the aircraft production and service method 1100 may include the propulsion system 100 including the variable compression air intake 134.

Referring to FIG. 11, which illustrates an example of the aircraft 1200. The aircraft 1200 includes the airframe 1202 having an interior 1206. The aircraft 1200 includes a plurality of onboard systems 1204 (e.g., high-level systems). An example of the onboard systems 1204 of the aircraft 1200 includes propulsion systems 1208, such as the propulsion system 100 (FIGS. 2-8). Other examples of the onboard systems 1204 include hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like.

Referring to FIG. 10, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 10 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the propulsion system 100, the air intake 134, and the method 1000 shown and described herein, may be employed during any one or more of the stages of the manufacturing and service method 1100 shown in the flow diagram illustrated by FIG. 10. In an example, propulsion systems 100 that include the air intake 134 and/or that operate according to the method 1000 may form a portion of component and subassembly manufacturing (block 1106) and/or system integration (block 1108). Further, propulsion systems 100 that include the air intake 134 and/or that operate according to the method 1000 may be implemented in a manner similar to components or subassemblies prepared while the aircraft 1200 is in service (block 1112). Also, propulsion systems 100 that include the air intake 134 and/or that operate according to the method 1000 may be utilized during system integration (block 1108) and certification and delivery (block 1110). Similarly, propulsion systems 100 that include the air intake 134 and/or that operate according to the method 1000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-8 and 11, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-8 and 11, referred to above, need be included in every example and not all elements, features, and/or components described herein are necessarily depicted in each illustrative example. Accordingly, some of the elements, features, and/or components described and illustrated in FIGS. 1-8 and 11 may be combined in various ways without the need to include other features described and illustrated in FIGS. 1-8 and 11, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-8 and 11, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-8 and 11, and such elements, features, and/or components may not be discussed in detail herein with reference to each of FIGS. 1-8 and 11. Similarly, all elements, features, and/or components may not be labeled in each of FIGS. 1-8 and 11, but reference numerals associated therewith may be utilized herein for consistency.

In FIGS. 9 and 10, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 9 and 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the propulsion system 100, the air intake 134, the aircraft 1200, and the method 1000 have been shown and described, modifications may occur to those skilled in the art upon reading the specification. The present application includes such modifications and is limited only by the scope of the claims.

What is claimed is:

1. A propulsion system for an aircraft, the propulsion system comprising:
an engine having a central axis;
a cowl surrounding the engine and comprising a cowl lip;
a compression ramp spaced away from the cowl lip and comprising a first bump and a second bump;
a diffuser ramp positioned between the second bump of the compression ramp and the engine;
a throat of an airflow path formed by the cowl and the compression ramp and comprising an inlet formed between the cowl lip and the compression ramp; and
a diffuser formed by the cowl and the diffuser ramp, wherein:
the first bump of the compression ramp protrudes into space upstream of the inlet of the throat;
the second bump of the compression ramp protrudes into space downstream of the inlet of the throat;
the compression ramp and the diffuser ramp are movable between a low-speed configuration of the propulsion system and a high-speed configuration of the propulsion system;
upon transition from the high-speed configuration to the low-speed configuration of the propulsion system:
the compression ramp is positioned relative to the cowl lip to expand a cross-sectional geometry of the throat at the inlet, as viewed along the central axis, and reduce compression of an inlet airflow through the inlet; and
the diffuser ramp is positioned relative to the cowl to form a substantially constant cross-sectional geometry of the diffuser, as viewed along the central axis, in a downstream direction; and
upon transition from the low-speed configuration to the high-speed configuration of the propulsion system:

the compression ramp is positioned relative to the cowl lip to reduce the cross-sectional geometry of the throat at the inlet, as viewed along the central axis, and increase the compression of the inlet airflow through the inlet; and the diffuser ramp is positioned relative to the cowl to expand the cross-sectional geometry of the diffuser, as viewed along the central axis, in the downstream direction from the compression ramp to the engine.

2. The propulsion system of claim 1, wherein the diffuser ramp is non-planar.

3. The propulsion system of claim 1, wherein:
the first bump is fixed relative to the cowl lip; and
the second bump is movable relative to the cowl lip and to the first bump to vary the compression of the inlet airflow through the inlet.

4. The propulsion system of claim 3, wherein:
the second bump is linearly movable along the central axis;
the second bump is revolvably movable about a first axis of revolution; and
the first axis of revolution is spaced away from the central axis and extends in a direction perpendicular to the central axis.

5. The propulsion system of claim 4, wherein:
the diffuser ramp is linearly movable along the central axis;
the diffuser ramp is revolvably movable about a second axis of revolution; and
the second axis of revolution is spaced away from the central axis and extends in a direction perpendicular to the central axis.

6. The propulsion system of claim 3, wherein the diffuser ramp is coupled to the second bump.

7. The propulsion system of claim 6, wherein the diffuser ramp moves with the second bump.

8. The propulsion system of claim 6, further comprising a seal located between the diffuser ramp and the second bump.

9. The propulsion system of claim 6, further comprising a gap located between the diffuser ramp and the second bump.

10. The propulsion system of claim 6, further comprising a seal located between the second bump and a portion of an interior wall of the cowl.

11. The propulsion system of claim 6, further comprising a seal located between the diffuser ramp and a portion of an interior wall of the cowl.

12. The propulsion system of claim 11, wherein the portion of the interior wall of the cowl is planar.

13. The propulsion system of claim 3, wherein the first bump is non-planar.

14. The propulsion system of claim 13, wherein the first bump comprises a conic section.

15. The propulsion system of claim 3, wherein the second bump is non-planar.

16. The propulsion system of claim 15, wherein the second bump comprises a conic section.

17. The propulsion system of claim 1, wherein, upon transition of the propulsion system from the low-speed configuration to the high-speed configuration:
the compression ramp and the cowl form a supersonic compression section of an air intake for the engine, wherein the supersonic compression section of the air intake converges toward a narrowest portion of the airflow path in the downstream direction; and the diffuser ramp and the cowl form a subsonic diffuser section of the air intake for the engine, wherein the subsonic diffuser section of the air intake diverges from the narrowest portion of the airflow path in the downstream direction.

18. The propulsion system of claim 1, wherein the compression ramp is non-planar.

19. The propulsion system of claim 1, wherein the diffuser ramp is coupled to and moves with the compression ramp.

20. An aircraft comprising:
an airframe; and
a propulsion system comprising:
an engine coupled to the airframe; and
an air intake in fluid communication with the engine and comprising:
an inlet cowl comprising a cowl lip;
a compression ramp spaced away from the cowl lip and comprising a first bump and a second bump that is spaced away from the first bump;
a diffuser ramp positioned between the second bump of the compression ramp and the engine;
a throat formed by the cowl and the compression ramp and comprising an inlet formed between the cowl lip and the compression ramp; and
a diffuser formed by the cowl and the diffuser ramp, wherein:
the first bump of the compression ramp protrudes into space upstream of the inlet of the throat;
the second bump of the compression ramp protrudes into space downstream of the inlet of the throat;
the compression ramp and the diffuser ramp are movable between a low-speed configuration of the propulsion system and a high-speed configuration of the propulsion system;
upon transition from the high-speed configuration to the low-speed configuration of the propulsion system:
the compression ramp is positioned relative to the cowl lip to expand a cross-sectional geometry of the throat at the inlet, as viewed along a central axis of the engine, and reduce compression of an inlet airflow through the inlet; and
the diffuser ramp is positioned relative to the cowl to form a substantially constant cross-sectional geometry of the diffuser, as viewed along the central axis of the engine, in a downstream direction; and
upon transition from the low-speed configuration to the high-speed configuration of the propulsion system:
the compression ramp is positioned relative to the cowl lip to reduce the cross-sectional geometry of the inlet, as viewed along the central axis of the engine, and increase the compression of the inlet airflow through the inlet; and
the diffuser ramp is positioned relative to the cowl to expand the cross-sectional geometry of the diffuser, as viewed along the central axis of the engine, in the downstream direction from the compression ramp to the engine.

21. The aircraft of claim 20, wherein:
the compression ramp is non-planar; and
the diffuser ramp is non-planar.

22. A variable compression air intake for a turbofan engine comprising:
a cowl comprising a cowl lip and a longitudinal axis;

a first compression surface protruding into space, wherein the first compression surface is spaced upstream from and is fixed relative to the cowl lip;

a second compression surface protruding into space, wherein the second compression surface is positioned downstream of the first compression surface and the cowl lip and is movable relative to the cowl lip;

a diffuser surface positioned downstream of the second compression surface and moveable relative to the cowl;

a throat formed by the second compression surface and the cowl lip; and a diffuser formed by the diffuser surface and the cowl, wherein:

the second compression surface and the diffuser surface are movable between a low-speed configuration of the variable compression air intake and a high-speed configuration of the variable compression air intake;

upon transition from the high-speed configuration to the low-speed configuration of the variable compression air intake:

the second compression surface is positioned relative to the cowl lip to increase a cross-sectional geometry of the throat, as viewed along the longitudinal axis, and reduce a compression of an inlet airflow through the throat; and the diffuser surface is positioned relative to the cowl to form a cross-sectional geometry of the diffuser that is substantially constant, as viewed along the longitudinal axis, in a downstream direction; and upon transition from the low-speed configuration to the high-speed configuration of the variable compression air intake;

the second compression surface is positioned relative to the cowl lip to decrease the cross-sectional geometry of the throat, as viewed along the longitudinal axis, and increase the compression of the inlet airflow through the throat; and the diffuser surface is positioned relative to the cowl to increase the cross-sectional geometry of the diffuser, as viewed along the longitudinal axis, in the downstream direction.

23. A method for varying compression at an air intake of a turbofan engine, the method comprising:

moving a compression ramp relative to a cowl lip of a cowl between a low-speed configuration of the air intake and a high-speed configuration of the air intake, wherein the compression ramp comprises a first bump that protrudes into space upstream of an inlet of the air intake and a second bump that protrudes into space downstream of the inlet of the air intake;

moving a diffuser ramp positioned between the compression ramp and the engine between the low-speed configuration of the air intake and the high-speed configuration of the air intake;

varying compression of an inlet airflow through the inlet of the air intake such that:

upon transition from the high-speed configuration to the low-speed configuration of the air intake, the compression ramp expands a cross-sectional geometry of the inlet, as viewed along a central axis of the turbofan engine, and reduces the compression of the inlet airflow through the inlet; and upon transition from the low-speed configuration to the high-speed configuration of the air intake, the compression ramp reduces the cross-sectional geometry of the inlet, as viewed along the central axis of the turbofan engine, and increases the compression of the inlet airflow through the inlet; and varying a cross-sectional geometry of a diffuser formed by the diffuser ramp and the cowl such that:

upon transition from the high-speed configuration to the low-speed configuration of the air intake, the cross-sectional geometry of the diffuser, as viewed along the central axis of the turbofan engine, is substantially constant in a downstream direction; and upon transition from the low-speed configuration to the high-speed configuration of the air intake, the cross-sectional geometry of the diffuser, as viewed along the central axis of the turbofan engine, expands in the downstream direction.

\* \* \* \* \*